J. KRESS.
MACHINE FOR CUTTING MEATS AND OTHER ARTICLES.
APPLICATION FILED MAY 7, 1909.

952,819.

Patented Mar. 22, 1910.
5 SHEETS—SHEET 1.

Witnesses:
F. M. Kilpatrick
Fannie Fisk

Inventor
John Kress
By his Attorneys

J. KRESS.
MACHINE FOR CUTTING MEATS AND OTHER ARTICLES.
APPLICATION FILED MAY 7, 1909.

952,819.

Patented Mar. 22, 1910.
5 SHEETS—SHEET 2.

Witnesses:
Inventor
John Kress
By his Attorney

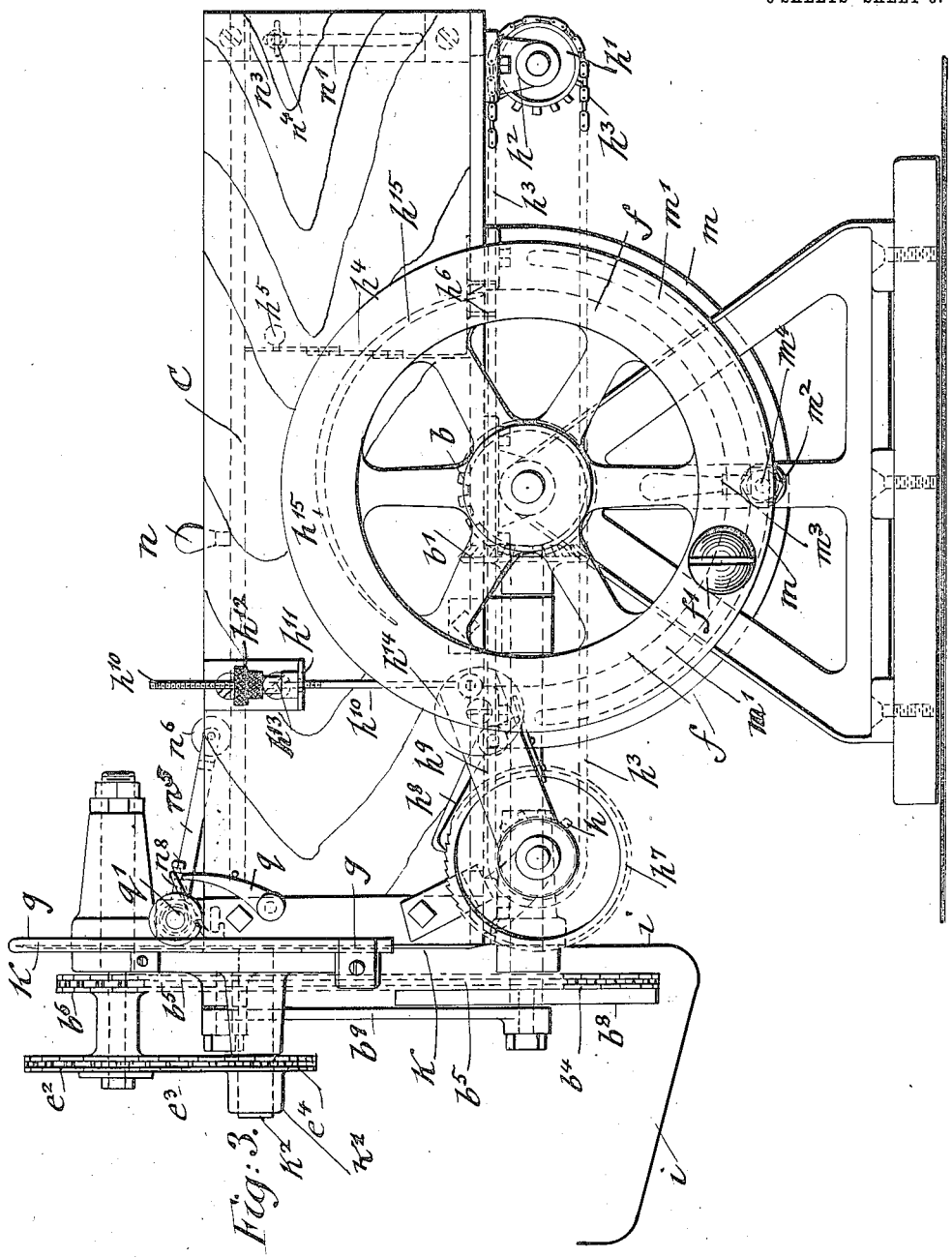

J. KRESS.
MACHINE FOR CUTTING MEATS AND OTHER ARTICLES.
APPLICATION FILED MAY 7, 1909.
952,819.
Patented Mar. 22, 1910.
5 SHEETS—SHEET 4.
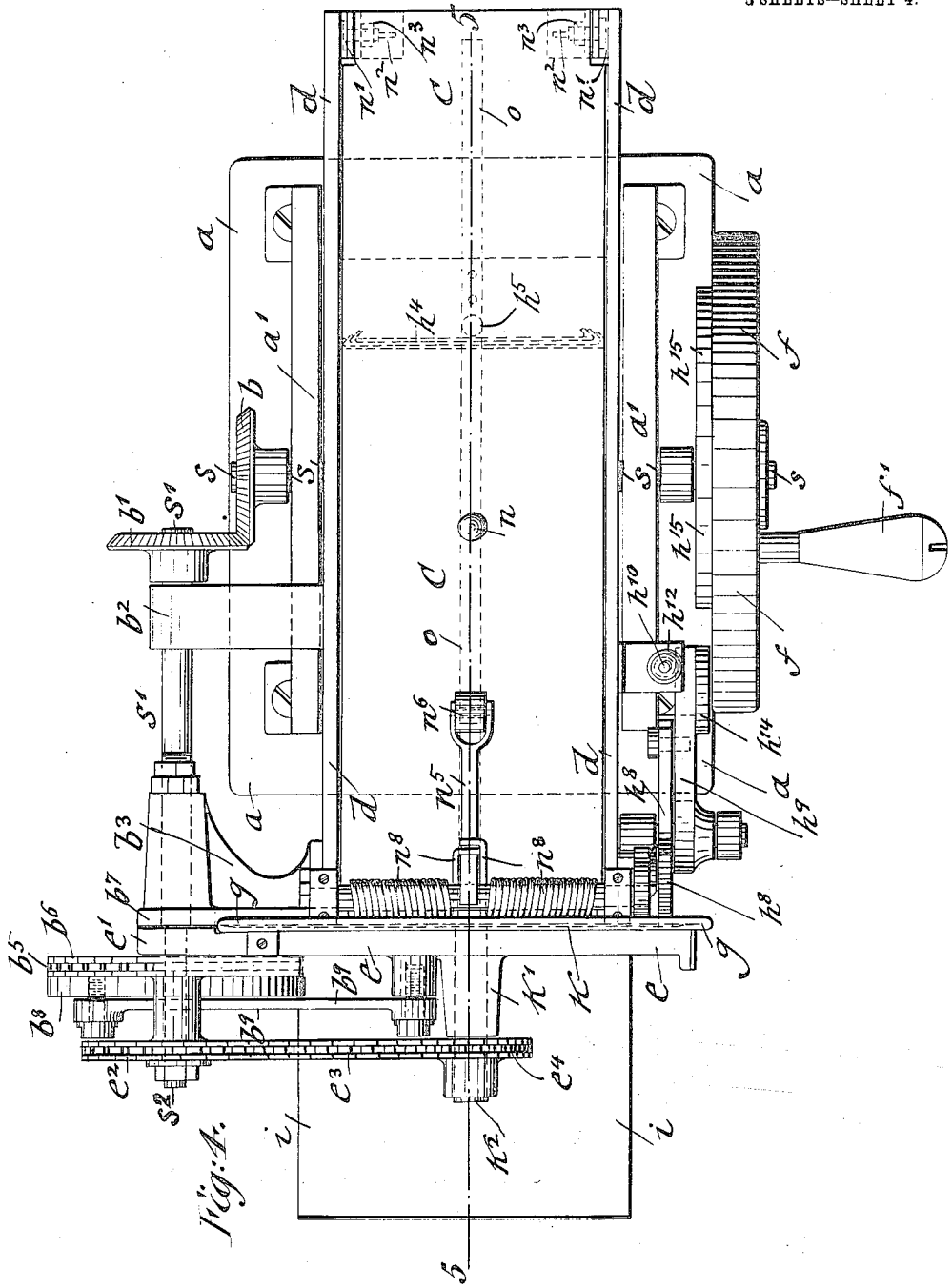
Witnesses:
H. M. Kilpatrick
Fannie Fisk
Inventor
John Kress
By his Attorneys
Fraenkel Goepel

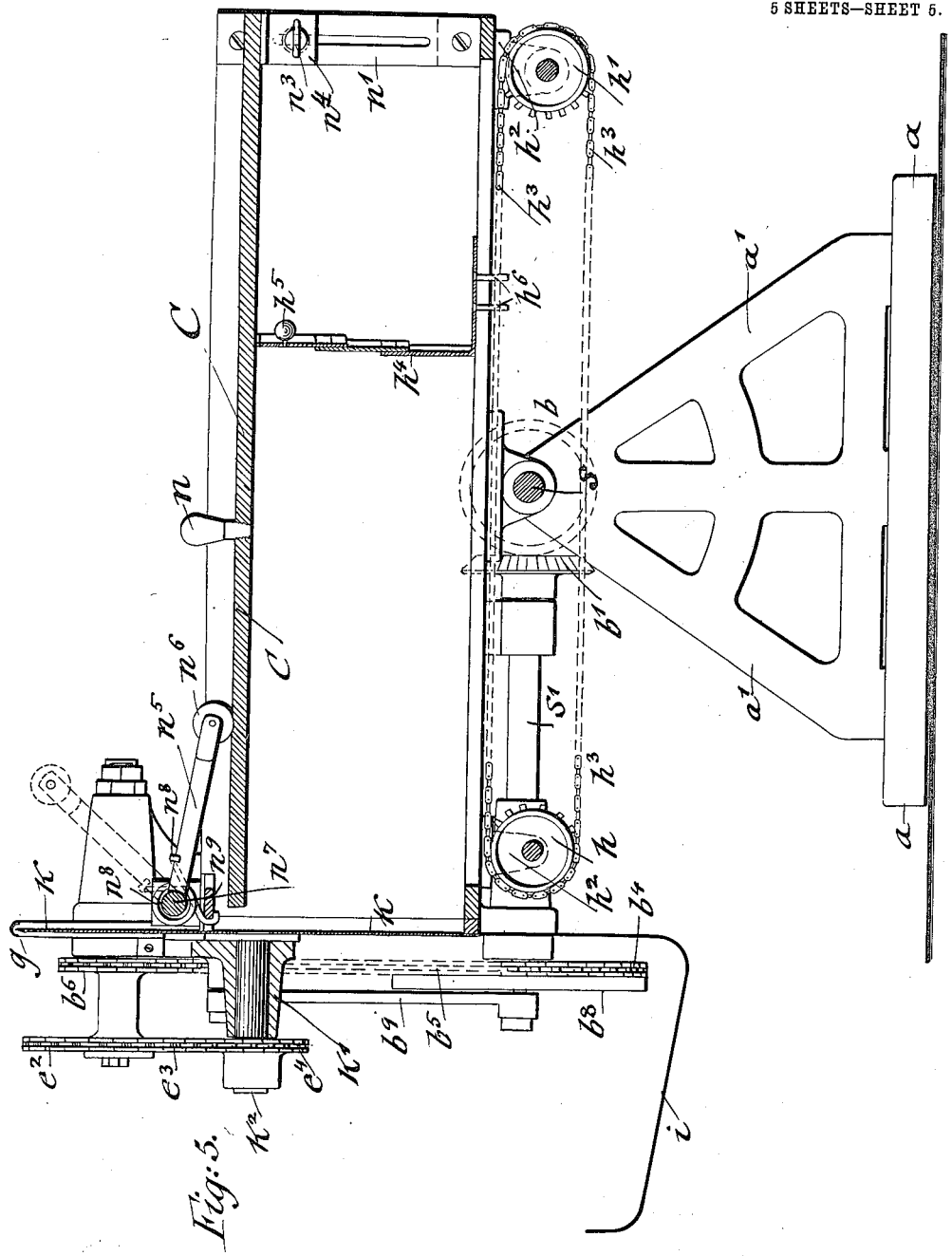

UNITED STATES PATENT OFFICE.

JOHN KRESS, OF NEW ROCHELLE, NEW YORK.

MACHINE FOR CUTTING MEATS AND OTHER ARTICLES.

952,819.  Specification of Letters Patent.  Patented Mar. 22, 1910.

Application filed May 7, 1909. Serial No. 494,596.

*To all whom it may concern:*

Be it known that I, JOHN KRESS, a citizen of the United States of America, residing at New Rochelle, in the county of Westchester and State of New York, have invented certain new and useful Improvements in Machines for Cutting Meats and other Articles, of which the following is a specification.

This invention relates to an improved machine for cutting smoked meats, bread, vegetables and other articles, in a quick and effective manner so as to be specially adapted for the use of hotels, restaurants, delicatessen-stores and the like, which handle a great deal of smoked meat and other hard substances; and the invention consists of certain details of construction which will be fully described hereinafter and finally pointed out in the claims.

Figure 1:
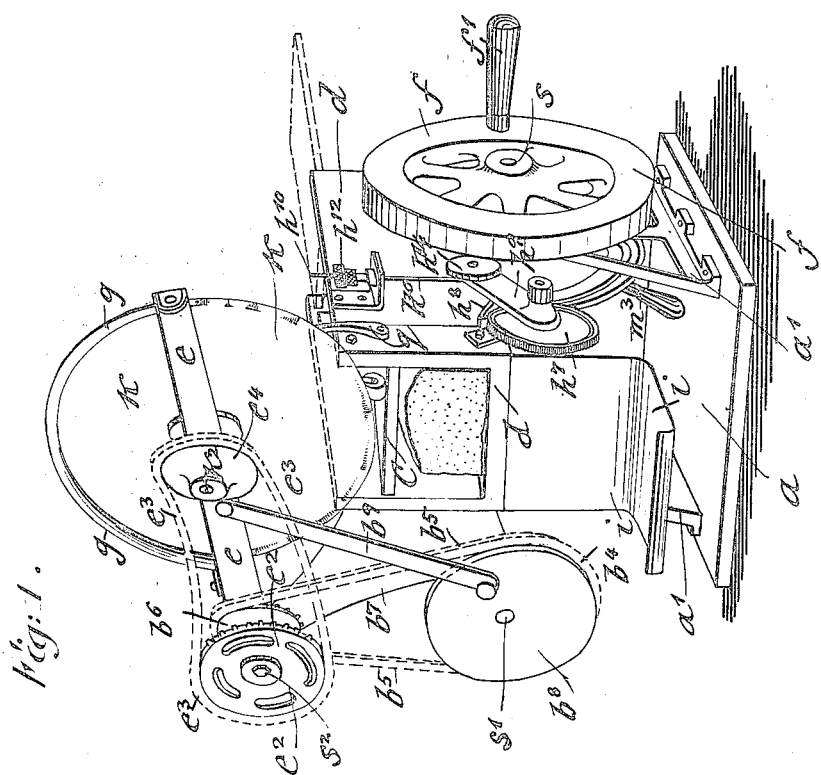
Figure 2:
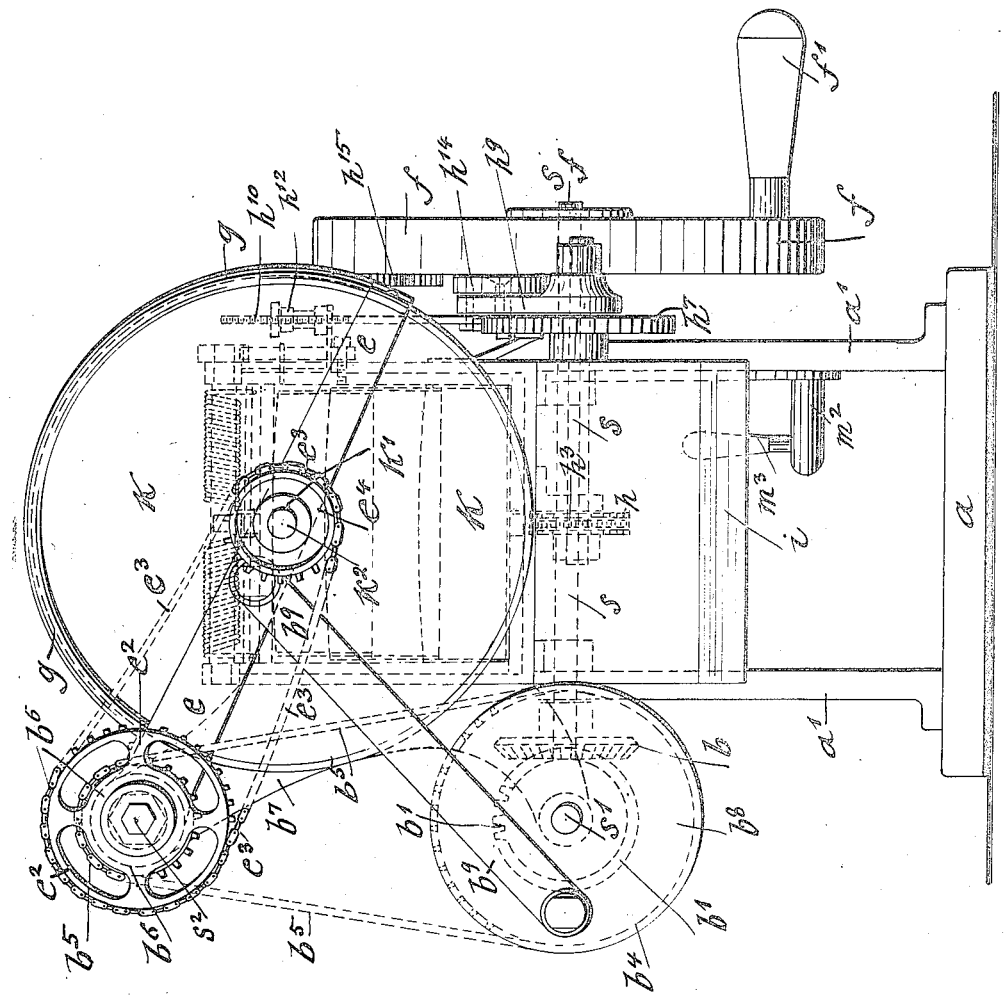

In the accompanying drawings, Figure 1 represents a perspective view of my improved meat-cutting machine, showing the disk-shaped cutting knife in raised position at the upper end of its stroke, Fig. 2 is a front-elevation of the machine, showing the disk-shaped cutting knife at the lower end of its stroke, Fig. 3 is a side-elevation of the improved meat-cutting machine, Fig. 4 is a plan-view, and Fig. 5 is a vertical longitudinal section on line 5, 5, Fig. 4.

Similar letters of reference indicate corresponding parts throughout the several figures of the drawings.

Referring to the drawings, $a$ represents the base and $a^1$ the upright side-standards of my improved machine for cutting meat and other articles. The side-standards $a^1$ are made of triangular shape and provided with bearings for the driving-shaft $s$ of the machine. The shaft $s$ extends from one side-standard to the other, and is provided at one end with a fly-wheel $f$ having a handle $f^1$, which is keyed to the shaft $s$, and at the opposite end with a bevel gear-wheel $b$ which meshes with a bevel gear-wheel $b^1$ at the rear-end of an auxiliary horizontal shaft $s^1$, which is supported in bearings of brackets $b^2$, $b^3$ that are attached to the side-wall of a feed-box $d$, which is seated on the plates of ears $d^1$ that are pivoted to the driving-shaft $s$, said feed-box being open at the top and front and rear ends.

To the front-end of the auxiliary side-shaft $s^1$ is applied a sprocket-wheel $b^4$ which is connected by a sprocket-chain $b^5$ with a sprocket-wheel $b^6$ that is placed loosely on a short shaft $s^2$, which is supported in a suitable bracket $b^7$ above the lower sprocket-wheel $b^4$. To the side-shaft $s^1$ is keyed adjacent to the sprocket-wheel $b^4$ a crank-disk $b^8$, which rotates with the sprocket-wheel $b^4$ and which is connected by a pivot-rod $b^9$ with an oscillating bar $e$ that carries adjacent to its pivot-connection with the connecting rod $b^9$ a hub $k^1$ in which the stud-shaft $k^2$ of a disk-shaped cutting knife $k$ is supported. The oscillating bar $e$ is provided at its upper end with a hub $e^1$ which turns on the shaft $s^2$ of the sprocket-wheel $b^6$. To the shaft $s^2$ of the sprocket-wheel $b^6$ is applied a second larger sprocket-wheel $e^2$ which transmits rotary motion by a sprocket-chain $e^3$ to a smaller sprocket-wheel $e^4$ on the stud-shaft of the disk-shaped cutting knife $k$ so as to impart to the latter continuous rotary motion in one direction simultaneously with the oscillating motion imparted to it by the oscillating bar $e$. The continuous rotary motion of the disk-shaped cutting knife in one and the same direction produces the uniform wear of the cutting knife around its entire circumference, while it permits also the sharpening of the edge of the cutting knife by holding a whetstone to the edge of the knife while the knife is rotated by the mechanism described.

For protecting the upper cutting edge of the knife and preventing injury while using the machine, a semicircular guard $g$ extends over the upper portion of the knife, said guard commencing adjacent to the bar $e$ and ending at the outer end of the same, leaving thereby the lower edge of the knife free, as shown clearly in Figs. 1 and 2.

The forward feeding of the article which is to be cut into thin pieces or slices is accomplished by means of sprocket-wheels $h$, $h^1$ that are supported in perforated ears $h^2$ attached to the under-side and along the center-line of the bottom of the feed-box. A sprocket-chain $h^3$ extends around the sprocket-wheels $h$, $h^1$. The sprocket-chain $h^3$ is connected with the lower end of a transverse follower $h^4$ that is located at the interior of the feed-box $d$ and formed of three sliding and guided sections, the upper section being provided with a knob or button $h^5$ for moving said sections in vertically-extended position. The lower end of the transverse follower $h^4$ is connected by means of lugs $h^6$ with two adjacent links of the sprocket-chain $h^3$, the lugs being guided in a longitudinal center-slot $o$ of the bottom of the feed-box. The sprocket-wheel $h$ is the driving sprocket and is moved intermittently on its axis by means of a ratchet-wheel $h^7$, which is mounted on the shaft of the driving sprocket-wheel $h$ and turned by a pawl $h^8$, which engages the teeth of the ratchet-wheel and which is pivoted to an oscillating arm $h^9$ that turns on the shaft of the driving sprocket-wheel, the outer end of said arm being connected with a pivot-rod $h^{10}$ which passes through a guide-stud $h^{11}$ attached to the upper outside wall of the feed-box. The rod $h^{10}$ is threaded at its upper end and provided with a screw-nut $h^{12}$, seated on a collar $h^{13}$, so as to permit of being adjusted higher or lower and produce a greater or smaller stroke of the pawl and thereby a longer or shorter forward feed-motion of the sprocket-chain and follower. The swinging arm $h^9$ carries at its outer end a roller $h^{14}$ which is acted upon by a raised segmental cam $h^{15}$ formed on the inner face of the fly-wheel $f$, said cam engaging the roller and swinging thereby the arm $h^9$ in upward direction, so that the pawl takes a greater or smaller number of teeth according to the adjustment of the arm by the pivot-rod $h^{10}$ referred to. The follower is thereby moved forward in the feed-box at each rotation of the fly-wheel until the meat or other article in the feed-box is cut up gradually into slices by the reciprocating and rotating cutting knife. The slices are dropped through the open front-end of the feed-box onto a fixed shelf $i$, from which they are removed from time to time. The feed-box $d$ may be arranged in horizontal or inclined position by means of a semicircular guide-strap $m$ which is attached to the bottom of the feed-box, and provided with an arc-shaped slot $m^1$ which permits the clamping of the semicircular strap to one of the side-standards of the supporting frame by means of a clamping nut $m^2$ having a lever-handle $m^3$. The clamping nut turns on a screw-post $m^4$ which passes through the slot $m^1$, as shown in Figs. 2 and 3.

The feed-box $d$ is provided with a cover C, which is preferably made of wood, sheet-metal or other suitable material, and provided with a handle $n$. The cover C is adjusted at its rear-end in slotted straps $n^1$ attached to the inner side-walls by means of set-screws $n^2$ that pass through angular brackets $n^4$ at the rear of the cover C, and thumb-nuts $n^3$, as shown in Fig. 5. The cover C is pressed on the article to be cut up by means of a spring-actuated presser-arm $n^5$ having a roller $n^6$ at its outer end, said arm being applied to a transverse pivot-shaft $n^7$ which turns in bearings at the upper end of the feed-box adjacent to the cutting knife. Strong helical springs $n^8$ are placed on the transverse pivot-shaft, the outer ends of the springs being applied to a recessed cross-bar $n^9$, while the inner ends are applied to the shank of the presser-arm $n^5$. The presser-arm $n^5$ presses the cover in downward direction so that the same hugs tightly the article to be cut by the knife, in connection with the follower, by which the article is fed to the cutting knife. As the cover is pressed in downward direction, it sets the sliding sections of the follower to the proper height. The follower-sections are frictionally guided one upon the other so as to retain their position during the forward motion of the follower. When the follower arrives near the cutting knife $k$, a new piece of meat or other article is placed back of the same into the feed-box. For this purpose the follower is returned by hand after first disengaging the pawl $h^8$ from the feed ratchet-wheel. When the pawl is released, the follower can be moved in backward direction, together with the sprocket-chain to which it is attached. Before the follower is moved forward again, the cover is swung on its pivot-screws in backward direction, as shown in dotted lines in Fig. 1. This is accomplished by first raising the presser-arm away from the follower and holding it in raised position by means of a stop-pawl $q$ that engages a notched disk $q^1$ at the end of the transverse pivot-shaft of the presser-arm, as shown in dotted lines in Figs. 3 and 5. In this position of the presser-arm, the cover can be swung backwardly on its pivots into rearward position, so as to permit the backward motion of the follower and the insertion of a new piece of meat or other article to be cut into the feed-box. After this is done the cover is moved down again over the article and the presser-arm lowered by releasing its stop-pawl, and the feed-pawl returned into engagement with the feed ratchet-wheel.

The continuous rotary motion imparted to the cutting knife, in connection with the oscillating motion, renders this construction also applicable for cutting hay, straw, beets and other feed for animals.

Having thus described my invention, I claim as new and desire to secure by Letters Patent:

1. In a machine for cutting meats and other articles, the combination of a support, a drive shaft carried by said support, a feed-box pivotally supported on said shaft, means for feeding the meat or other article step by step in forward direction, a disk-shaped cutting knife, and means connected with said drive shaft for imparting continuous rotary motion to said knife and oscillating motion to the same.

2. In a machine for cutting meats and other articles, the combination of a support, a drive shaft carried by said support, a feed-box pivotally supported on said shaft, mechanism for intermittently feeding the meat or other article in forward direction in the same, of a disk-shaped cutting knife arranged at the end of the feed-box, means for transmitting from said drive shaft continuous rotary motion to said knife in one direction, an oscillating bar provided with journal-bearings for the shaft of the cutting knife, and means for imparting oscillating motion to the knife-supporting bar.

3. In a machine for cutting meats and other articles, the combination of a support, a drive shaft carried by said support, a feed-box pivotally supported on said shaft, means for feeding the meat or other article step by step forward in the same, of a supporting bracket-arm attached to the side-wall of the feed-box, an oscillating arm pivoted to said bracket-arm, a disk-shaped cutting knife the shaft of which is supported in journal-bearings of the oscillating arm, means connected with the drive shaft for transmitting continuous rotary motion to the cutting knife, and oscillating motion to the supporting bar and cutting knife.

4. In a machine for cutting meats and other articles, the combination, with a feed-box having a longitudinal slot and provided with an interior follower formed of sliding and extensible sections, of a sprocket-chain connected with the base of said follower, a guiding sprocket-wheel at one end of the sprocket-chain and a driving sprocket-wheel at the opposite end of the same, a pawl and ratchet-wheel mechanism arranged on the shaft of the driving sprocket-wheel, an oscillating arm on the shaft of the driving sprocket-wheel, means for adjusting said arm higher or lower for adjusting the throw of the pawl, a driving-shaft, a fly-wheel on said driving-shaft, and a cam on said fly-wheel for actuating the pawl-carrying arm, ratchet-wheel mechanism and chain and sprocket-wheel transmission for intermittently moving the follower in forward direction.

5. In a machine for cutting meats and other articles, the combination of a feed-box, a vertical follower in said feed-box, means for intermittently moving the follower in forward direction, a cover hinged to the rear-end of the feed-box, means for adjustably clamping the cover to the rear-end of the feed-box, and a spring-actuated presser-arm arranged at the front-end of the feed-box for holding the cover on the article in the feed-box.

6. In a machine for cutting meats or other articles, the combination of a feed-box, a vertical follower in the same, means for imparting intermittent forward motion to the follower, a cover for the feed-box, means for clamping the rear end of the cover at different heights, a spring-actuated arm pressing on the free end of the cover, and means for holding said arm in raised position when the cover is to be opened.

7. In a machine for cutting meats or other articles, the combination, with a supporting stand having journal-bearings for the driving-shaft, of a feed-box supported on said driving-shaft, an intermittently-movable follower in said feed-box, a cover for the same, a continuously-rotating and simultaneously oscillating disk-shaped cutting knife, a shelf arranged at the outgoing end of the feed-box below said cutting knife, a slotted semicircular strap attached to the under-side of the feed-box, and means for clamping said strap for supporting the cutting machine in horizontal or inclined position.

8. In a machine for cutting meats and other articles, the combination of a feed-box, an adjustable follower composed of a series of superposed sections frictionally engaging each other, a cover for said box adapted to be pressed downwardly upon the article to be cut and upon said follower, and means for pressing said cover downwardly.

9. In a machine for cutting meats and other articles, the combination of side standards having bearings supported thereon, a drive shaft in said bearings, a feed-box adjustably pivotally mounted on said shaft, means carried by one of said standards and said box for locking said box in adjusted position and cutting mechanism carried by said box and operated by said shaft.

In testimony, that I claim the foregoing as my invention, I have signed my name in presence of two subscribing witnesses.

JOHN KRESS.

Witnesses:
PAUL GOEPEL,
HENRY J. SUHRBIER.